June 14, 1960 L. H. CONNELL 2,941,045

MAGNETIC RECORDING

Filed Jan. 29, 1954 2 Sheets-Sheet 1

INVENTOR.
LAWRENCE H. CONNELL
BY Whittemore, Hulbert & Belknap
ATTORNEYS

INVENTOR.
LAWRENCE H. CONNELL
BY Whittemore, Hulbert & Belknap
ATTORNEYS

United States Patent Office

2,941,045

Patented June 14, 1960

2,941,045

MAGNETIC RECORDING

Lawrence H. Connell, 234 S. 10th St., Haines City, Fla.

Filed Jan. 29, 1954, Ser. No. 407,130

10 Claims. (Cl. 179—100.2)

The present invention relates to a magnetic transducer which may be either a recording or reproducing magnetic circuit.

The present application is a continuation-in-part of my prior copending application Serial No. 74,936 filed February 7, 1949, now abandoned.

It is an object of the present invention to provide a transducer of the character described which is highly efficient in use, simple and inexpensive to make.

It is a further object of the present invention to provide a transducer comprising essentially a strip of foil of electrically conducting non-magnetic metal and a U-shaped magnet formed of paramagnetic material extending transversely around one edge and two sides of said strip, the surfaces at the ends of said U-shaped magnet being continuous with the edge surface of said strip.

It is a further object of the present invention to provide a transducer in which the electromagnet is provided by a coating of paramagnetic material on a strip of electrically conducting non-magnetic material.

It is a further object of the present invention to provide a transducer in which the electromagnet is formed by thin foil of paramagnetic material formed into a U-shape and extending transversely around one edge and two sides of a strip of foil of an electrically conducting non-magnetic material.

It is a further object of the present invention to provide a transducer of the character described in which the strip of electrically conducting material and the U-shaped magnet are received within a case formed of an electrically non-conducting and non-magnetic material.

It is a further object of the present invention to provide a transducer as described in the preceding paragraph in which the case is formed of two members having flat surfaces pressed into firm engagement with the edge portions of the magnet and the portion of the electrically conducting strip interposed therebetween.

Other objects and features of the invention will become apparent as the description proceeds, especially when taken in conjunction with the accompanying drawings, wherein.

Figure 1:
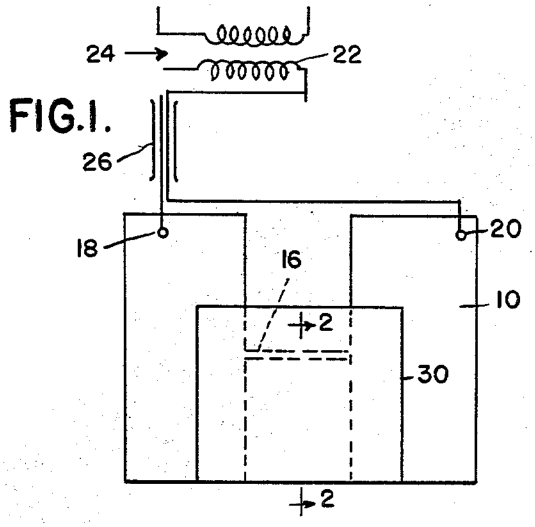
Figure 1 is a side elevation of the operating elements of the improved transducer with an electric circuit illustrated diagrammatically.
Figure 2:
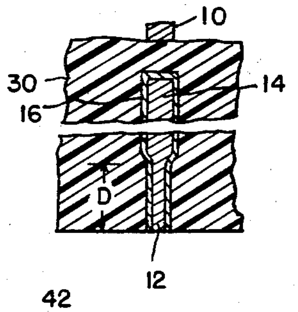
Figure 2 is a fragmentary section on the line 2—2, Figure 1, with the thickness of the electrically conducting strip and the magnet element having a thickness greatly exaggerated for clarity.

Referring now to Figures 1 and 2 there is illustrated an improved magnetic head or transducer for use in magnetic recording and reproducing apparatus. The transducer comprises a thin sheet 10 of electrically conducting material such for example as copper, silver, or the like, one edge portion of which is relatively thin as indicated at 12. Conveniently, the sheet 10 may be a copper foil having a thickness of about .002 inch and its edge portion 12 may be etched or otherwise treated to reduce it to a thickness of approximately .001 inch, or less. The transverse width of the edge portion 12 which is of reduced thickness is relatively small, this being represented by the dimension D in Figure 2. This dimension is no more than is required to produce a pole face on the magnet which will have a satisfactory life due to wearing away from contact with the record element which is advanced in contact with the transducer. It is preferably less than one-tenth of an inch. It will be appreciated that leakage flux is reduced by reducing the dimension D as far as possible, the thickness of the portion 14 of the sheet 10 being sufficient to prevent substantial leakage flux.

It will of course be appreciated that the thickness of the sheet 10 and associated magnet in Figure 2 is greatly exaggerated for the purpose of clarity.

The dimension of the unetched or relatively thick portion 14 of the foil is sufficient to provide an adequate current carrying capacity to establish the required magnetizing force in the magnetic head. In a practical embodiment of the present invention, the portion 14 of the sheet had a width of .1 inch and operated entirely satisfactorily.

As illustrated in Figures 1 and 2, the ends of the strip may be exposed for the purpose of radiating heat developed by the current induced within the sheet.

In order to complete the head a generally U-shaped magnet 16 is provided which extends transversely around two sides and one edge of the sheet 10 intermediate the points 18 and 20 to which electrical conductors are connected. The magnet 16 is provided in the form of a coating of permeable magnetic material such for example as iron, and it may be applied to the copper sheet 10 by plating, chemical deposition, thermal evaporation, sputtering or the like.

In the event the application of the magnetic material is by plating, the sheet 10 may be lacquered or otherwise coated where it is not to be plated. The portion to be plated is cleaned with a detergent, rinsed, dipped in acid, and finally rinsed in distilled water.

The thickness of the magnetic coating may be very small as for example .0001 or .002 inch at the departing pole face if "flutter" is to be eliminated. The thickness of the magnetic film is of critical importance at the departing pole face. For the remainder of the magnet 16 it is only necessary that the magnetic material be provided in sufficient quantity to afford a flux path having a low reluctance.

The reduced edge portion 12 of the sheet 10 serves a dual function. In the first place it provides a gap in the magnetic circuit. In the second place, since the edge portion 12 is located between the adjacent pole faces of the magnet, and since the material has a high electrical conductivity, leakage flux includes eddy currents therein. These are of such a direction as to minimize the leakage flux passing directly between the poles of the magnet and accordingly increase the amount of magnetic flux which is forced through the path provided by the portion of the record element in contact with the magnet poles.

The sheet 10 is connected to the secondary 22 of a transformer 24, as illustrated in Figure 1. Preferably, this connection is by shielded conductors as diagrammatically represented at 26. The magnetizing force produced by the magnet is of course measured in ampere turns and it will be appreciated that the electro-magnet 16 illustrated in this figure constitutes a single turn. Accordingly, in order to obtain the required magnetizing force it is necessary to obtain an adequate amperage through the sheet 10. It is found that with dimensions as set forth by way of example above, the current carrying capacity of the copper sheet 10 is entirely adequate to carry the required amperage without objectionable heating.

Preferably, the head is protected against stray currents in a supporting member after it is completed by coating it with a suitable material such for example as a silicone paint. This coating is also important as a corrosion retarding agent. A slight amount of corrosion might introduce serious variations in the magnetic properties of any of the exposed extremely thin coatings of magnetic material.

Since the portion of the head comprising the edge portion 12 of the foil and the thin coatings which form the magnet 16 are extremely thin and do not have any substantial mechanical strength, it is necessary to provide means for supporting the portion of the head which contacts the record element. This may be done by embedding the pole portion of the head in a block 30 of suitable plastic material. If preferred, it may be embedded in a Phosphor bronze body, in which the Phosphor bronze is preferably separated from the metallic elements of the head by an interposed layer of the silicone lacquer referred to above. The sheet 10 and the coatings which form the magnet 16 may be considered as interlinked U-shaped members associated so that variations in current in the sheet 10 induces corresponding force in magnetization of the magnet coatings which form the magnet 16.

Figure 3:
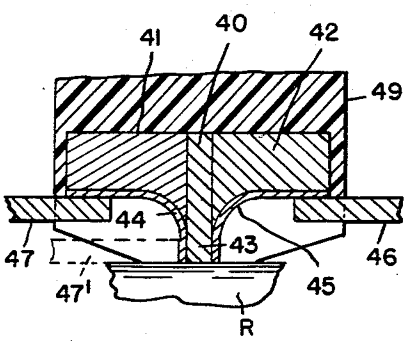
Figure 3 is a section through a transducer of different design.
Figure 6A:
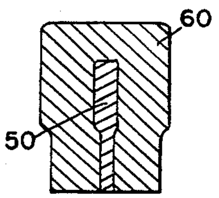
Figure 6A is a transverse sectional view through the assembled magnet and strip.

Referring now to Figure 3 there is illustrated a somewhat different embodiment of the magnetic head or transducer. In this case an electrically conducting foil 40 is provided which is supported between blocks 41 and 42 of the same material. The edge of the foil 40 extends somewhat beyond the blocks 41 and 42 as indicated at 43. Thin coatings 44 and 45 of a suitable permeable magnetic material are provided and these may be applied by plating, chemical deposition, thermal evaporation, sputtering or otherwise. As in the embodiment previously described, the thickness of the coatings of magnetic material 44 and 45 are extremely thin as approximately .0001 or .0002 inch. The thickness of the copper foil is relatively small as for example .001 inch.

The design of the head may vary in accordance with the type of recording employed. Thus, if the head is for use with high frequency bias, only one side of the foil is plated, the width of the other pole not being critical. Thus for example, the magnet may be completed by a yoke comprising end portions 46 and 47 and on the approaching side of the transducer, the end portion 47 of the yoke may be located in the dotted line position indicated at 47' which as illustrated is in contact with the record element R.

The edge portion 43 of the foil to which the coatings 44 and 45 are applied serves a double function. In the first place it provides the gap in the magnetic circuit. In the second place, by employing an electrically conducting material as the support element and by providing this material intermediate the poles of the magnet, the leakage flux between these closely spaced poles is substantially reduced. Accordingly, the effect of the magnetizing force available for magnetizing the permanent magnet material of the record element R is increased. Unless care is taken to reduce this leakage flux a field cannot be established in the record element of sufficient intensity to effect permanent magnetization.

The electromagnet is completed by a yoke of iron or other suitable material, the ends of which as previously described, are illustrated at 46 and 47 and are in firm flux conducting magnetic contact with the portions of the magnetic coatings 44 and 45. Again, it is important that the area of the head in which the coatings 44 and 45 are separated only by the thickness of the conducting foil 43, be reduced to a minimum so as to minimize flux transfer therethrough. In this embodiment this result is obtained by the use of the blocks 41 and 42 so that the coatings 44 and 45 are separated except for a narrow zone adjacent the edge portion 43. The vertical dimension of the parts, as seen in Figure 3 in which the films 44 and 45 are separated only by the foil 40, is selected such as to provide a pole face for the magnet which will exhibit satisfactory life due to wear from contact with the record element R which is advanced in contact therewith.

As in the embodiment previously described, it is necessary to provide mechanical support for the front edge of the head made up by the plated foil 43. This may be accomplished by embedding the lower portion of the head in a block 49 of supporting material such for example as a suitable plastic, or Phosphor bronze separated from the metallic elements of the head by a suitable material such as silicone lacquer. In this case the magnetizing force of the electromagnet is supplied by windings around the magnet yoke so that any desired number of turns in the electromagnet may be employed, with a corresponding reduction of amperage in the exciting current.

It is important that the material of the pole pieces of the magnet have a very narrow hysteresis loop. Depending upon the manner in which the magnetic material is deposited, it may some times occur that the material exhibits the property of a wide hysteresis loop. In this case it is necessary to treat the magnetic material so as to reduce the width of the hysteresis loop. Iron deposited from an acid chloride bath is mechanically hard and exhibits the property of a wide hysteresis loop. This material when annealed by heating in a hydrogen atmosphere to 900 degrees centrigrade is softened and the width of its hysteresis loop is reduced to a small fraction of its original value. Corresponding treatment for other materials may be necessary in accordance with well known practice.

Figure 4:
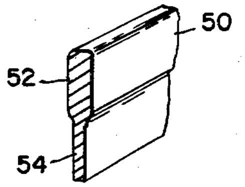
Figure 4 is a fragmentary perspective view partly in section, of a strip of electrically conducting non-magnetic material used in the construction of yet another form of transducer.

Referring now to Figures 4–7 there is illustrated yet another embodiment of the present invention. In Figure 4 there is illustrated a strip 50 formed of a suitable electrically conducting non-magnetic metal. Preferably, the strip 50 is in the form of a foil and has a relatively thick longitudinally extending portion 52 and a relatively thin longitudinally extending edge portion 54. Conveniently, the strip 50 may be formed of copper foil and the relatively thick portion may have a thickness of about .002 inch. The thickness of the relatively thin edge portion 54 will depend upon the purpose for which the head is designed. Thus for example, if the head is designed for play-back the relatively thin portion 54 may have a thickness of approximately .0002 inch. Where the head is designed for recording the thickness of the relatively thin portion 54 may be about .0005 to .0010 inch. The transverse width of the strip may be approximately one-quarter of an inch. It will be course be obvious that the thickness of the foil is greatly exaggerated in the figure for purpose of clarity.

Figure 5:
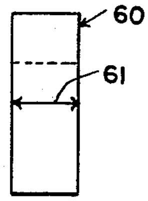
Figure 5 is a side elevation of a magnet employed in conjunction with the strip illustrated in Figure 4.
Figure 6:
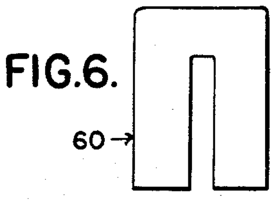
Figure 6 is an end elevation of the magnet illustrated in Figure 2, this figure greatly exaggerating the thickness of the magnet for purposes of clarity.

Referring now to Figures 5 and 6 there is illustrated a magnet 60 for association with the strip 50. The magnet may conveniently be formed of mu metal in the form of a foil bent into the U-shape illustrated in the figures. The width of the magnetic foil as illustrated by the dimension 61, may be approximately one-quarter of an inch if the head is designed for use with a single channel flat recording tape, or relatively narrow as for example .11 inch if employed with dual channel tape. The thickness of the magnetic foil should be as thin as possible but may have a thickness as high as .020 or .025 inch, and still give excellent results. Desirably, the thickness of the magnetic foil is about .010 inch. Excellent results have been obtained in a practical embodiment of the present invention employing mu metal foil having a thickness of .014 inch. It will of course be appreciated that the relative thickness of the foil illustrated in Figures 5 and 6 is grossly exaggerated to correspond to the exaggerated thickness of the conducting strip illustrated in Figure 4.

Figure 7:
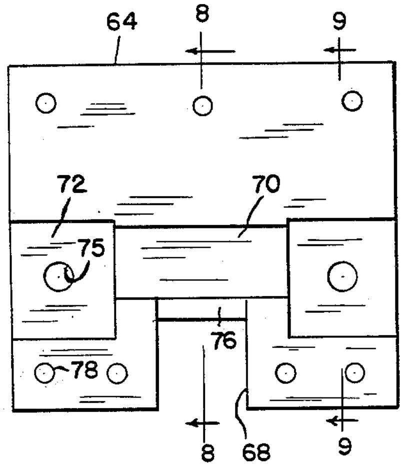
Figure 7 is a side elevation of one section of a case forming the magnet.
Figures 8, 9:
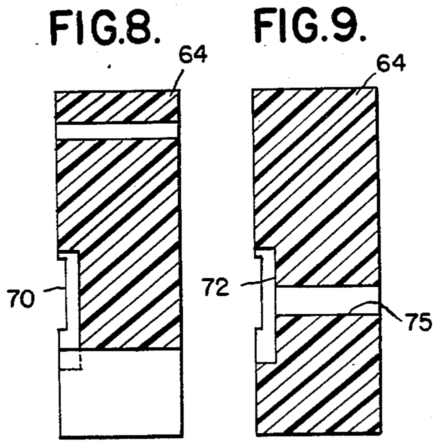
Figure 8 is a section on the line 8—8, Figure 7.
Figure 9 is a section on the line 9—9, Figure 7.
Figures 10, 11, 12:
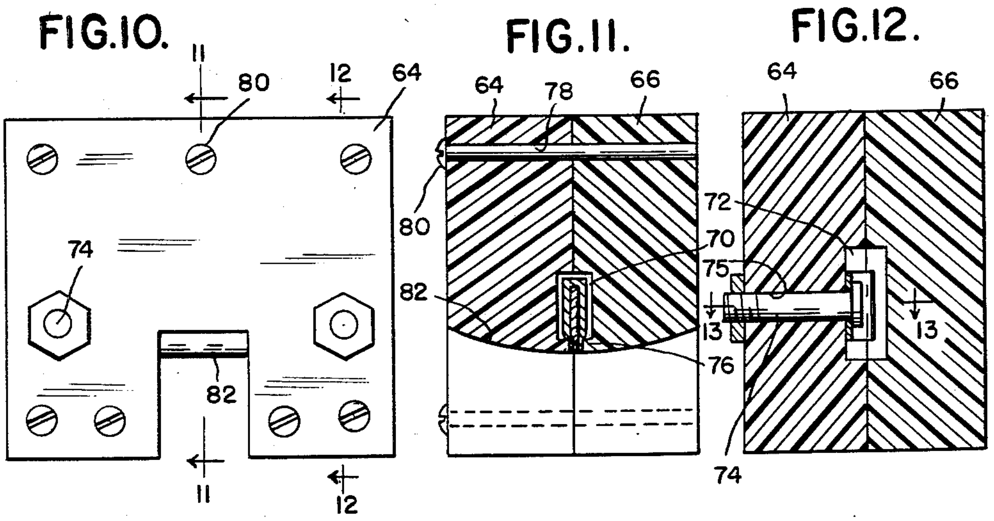
Figure 10 is a side elevation of an assembled transducer employing the elements illustrated in Figures 4–9.
Figure 11 is a section on the line 11—11, Figure 10.
Figure 12 is a section on the line 12—12, Figure 10.
Figure 13:
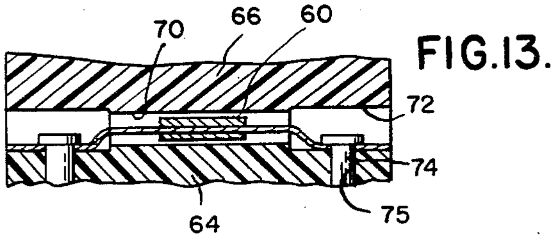
Figure 13 is a fragmentary section on the line 13—13, Figure 12.

The transducer is completed by assembling the U-shaped magnet 60 transversely to extend around two sides and the relatively thick edge of the strip 50. To complete the assembly a case is provided formed of a pair of similar members 64 and 66. The member 64 is illustrated in Figures 7–9. This member may conveniently be formed of a plastic material such for example as Bakelite, or any suitable material. If the case members are formed of electrically conducting material they will of course be insulated from the metal elements of the head by lacquer or the like. The member 64 is shown as of generally rectangular configuration having a rectangular recess 68 formed in one edge. Extending transversely across the surface of the member 64 which is to be its inner surface in assembly, is a relatively thin channel 70 dimensioned to accommodate the relatively thick portion 52 of the strip and the closed end of the magnet 60 which extends thereover. At the ends of the channel 70 are enlarged recesses 72 into which the ends of the strip 50 extend and which receive the ends of conducting members 74, as best illustrated in Figure 12, the members extending through openings 75 provided in the member 64. Extending downwardly from the channel 70 is a relatively thin channel 76 which receives the relatively thin portion of the assembly of conducting foil 50 and superimposed magnet 60. Openings 78 are provided in the members 64 and 66, for the reception of assembly screws 80, the openings in one of the members 64 or 66 being threaded and the corresponding openings in the other member being slightly enlarged whereby the screws 80 may operate to force the members 64 and 66 together.

The surface portions of the channels 76 of the members 64 and 66 are flat, accurately finished compression surfaces which are adapted to press the end portions of the magnet 60 inwardly into tight contact with the reduced portion 54 of the conducting strip 60. Pressure is developed by tightening the screws 80 and the result is that at the operating surface 82 of the transducer, an edge surface of the relatively thin portion 54 of the strip is exposed which is clamped between corresponding end surfaces of the magnet 60. After the transducer has been assembled as illustrated in Figures 10–12, the surface 82 thereof is machined to the convex arcuate configuration illustrated in Figure 11. There is thus provided a channel in which the tape is guided against lateral movement and a smooth convex surface over which the tape or other record element is advanced.

The chamber in the assembled transducer provided by the channel 70 may be somewhat wider than the upper portion of the assembly of the magnet and strip and the ends of this chamber extend into the relatively deeper recesses 72 so that heat developed during operation of the head may be dissipated. The electrically conducting members 74, which extend through the openings 75, will also serve as thermal conductors to dissipate heat from the interior of the transducer.

It will be appreciated that in Figures 11 and 12 the thickness of the combined electrically conducting strip and magnet are still greatly exaggerated for purposes of clarity, but are shown on an entirely different scale from that employed in Figures 4–6. Inasmuch as examples of dimensions and limits of dimensions have been set forth in the specification it is believed that the illustration as given in the figures is best adapted to clarify the actual construction of the parts.

The drawings and the foregoing specification constitute a description of the improved magnetic recording in such full, clear, concise and exact terms as to enable any person skilled in the art to practice the invention, the scope of which is indicated by the appended claims.

What I claim as my invention is:

1. A transducer comprising a strip of foil of electrically conducting non-magnetic metal, a U-shaped foil element formed of paramagnetic material extending transversely around said strip and having its end surfaces forming a continuous surface with one edge surface of said strip, the end portions of said U-shaped element being pressed firmly against the interposed edge portions of said strip, said strip having a longitudinally extending portion adjacent its said one edge surface which is relatively thin, the remainder of said strip being relatively thick to provide substantial current carrying capacity.

2. A transducer as defined in claim 1 in which the relatively thin edge portion of said strip has a thickness of between .0001 and .0015 inch, and the relatively thick portion thereof has a thickness of about .002 inch.

3. A transducer as defined in claim 1 in which the material of said U-shaped element has a thickness of less than .025 inch.

4. A transducer as defined in claim 1 in which the material of said U-shaped element has a thickness of between .010 and .020 inch.

5. A transducer as defined in claim 1 in which the relatively thin edge portion of said strip has a thickness of between .0001 and .0015 inch, the relatively thick portion thereof has a thickness of about .002 inch, and in which the material of said U-shaped element has a thickness of less than .025 inch.

6. A transducer as defined in claim 1 in which the relatively thin edge portion of said strip has a thickness of between .0001 and .0015 inch, the relatively thick portion thereof has a thickness of about .002 inch, and in which the material of said U-shaped element has a thickness of between .010 and .020 inch.

7. A transducer as defined in claim 1 and further comprising a case formed of electrically non-conducting, non-magnetic material in which said foil and U-shaped elements are disposed.

8. A transducer as defined in claim 7 in which said case comprises a pair of members having accurately shaped flat opposed surfaces engaging the end portions of said U-shaped element, and means for clamping said opposed surfaces firmly against said end portions.

9. A transducer as defined in claim 8 in which the ends of said strip extend beyond the sides of said U-shaped element, said members having recesses therein in registration with the said end portions of said strip, and electrical conductors having portions in said recesses engaging the said end portions of said strip and portions extending to the exterior of said case.

10. A magnetic head comprising an electrically conducting body having an edge portion of a thickness of about .001 inch and a main portion whose thickness is at least twice the thickness of the edge portion, electric conductors secured to spaced points of said main portion, and a magnet comprising a coating of permeable magnetic material having pole faces coplanar with the edge surface of said edge portion, said coating extending around said body intermediate said spaced points and having a thickness of about .0002 inch.

References Cited in the file of this patent

UNITED STATES PATENTS

| | | |
|---|---|---|
| 2,361,753 | Eilenberger | Oct. 31, 1944 |
| 2,418,542 | Camras | Apr. 8, 1947 |
| 2,479,308 | Camras | Aug. 16, 1949 |
| 2,532,100 | Howell | Nov. 28, 1950 |
| 2,536,272 | Friend | Jan. 2, 1951 |
| 2,647,167 | Rettinger | July 28, 1953 |
| 2,674,659 | Berhrendorf | Apr. 6, 1954 |
| 2,693,508 | Lord | Nov. 2, 1954 |